Patented Dec. 31, 1946

2,413,598

UNITED STATES PATENT OFFICE 2,413,598

CATALYTIC CONVERSION OF ALICYCLIC KETONIC COMPOUNDS

Seaver A. Ballard, Oakland, and De Loss E. Winkler, Berkeley, Calif., assignors to Shell Development Company, San Francisco, Calif., a corporation of Delaware No Drawing. Application March 23, 1943, Serial No. 480,259

16 Claims. (Cl. 260—290)

The present invention relates to catalytic treatment of non-aromatic cyclic ketonic compounds to form valuable products, such as aromatic amino compounds and aromatic hydroxylated compounds, all of which have the same number of nuclear carbon atoms as the starting material, as well as of certain heterocyclic compounds containing a nitrogen atom in the ring. More specifically, the invention pertains to a novel process for the catalytic treatment of ketonic compounds containing a non-aromatic cyclic, and particularly monocyclic, nucleus of six carbon atoms, to convert them into valuable products of the above type, and particularly to produce aromatic amino compounds having the same number of nuclear carbon atoms as contained in the alicyclic nucleus of the starting ketonic compound. In one of its most specific embodiments, the present invention is directed to a direct process of treating isophorone (3,5,5-trimethyl cyclohexene-2-one), as well as homo-isophorone, and their holomogues, to produce high yields of aromatic amino compounds, e. g. 3,5-dimethyl aniline (3,5-xylidine), as well as dimethyl phenols and collidines. The conversions of the starting materials to these valuable products, as well as the percentages thereof in the reaction products, will depend on certain variables to be discussed in detail hereinbelow.

It is known that aromatic amino compounds, such as aryl amines, may be produced by reacting the corresponding aromatic hydroxylated compound, e. g. phenol, with an amine under suitably high temperatures and pressures and under the influence of certain catalysts. As to the heterocyclic compounds containing a nitrogen atom in the ring, some of these, such as pyridine and certain of its homologues, e. g. picolines and lutidines, are obtained from coal tar and/or bone oil, while others, such as the collidines, require complicated and costly methods of production, such as the interaction of acetoacetic ester with aldehyde-ammonia and the subsequent dehydration step, or the high temperature reaction between acetamide and acetone.

It has now been discovered that the above-outlined aromatic amino and/or aromatic hydroxy compounds, as well as certain heterocyclic compounds with nuclear nitrogen atoms, particularly their alkylated derivatives, may be readily and economically produced by subjecting the hereinabove outlined and hereinbelow more fully described ketonic compounds containing at least one non-aromatic cyclic nucleus to the action of ammonia (or of primary or secondary amines), at elevated pressure and in the presence of certain catalysts which may be generally defined as those possessing a relatively high dehydrogenating activity. It has been found that satisfactory yields of aromatic amino compounds may be prepared directly from non-aromatic cyclic and particularly monocyclic ketonic compounds containing the same number of nuclear carbon atoms by subjecting these ketonic compounds, together with ammonia or primary or secondary amines, to the action of dehydrogenating catalysts, and particularly those described more fully hereinbelow, at elevated temperatures which are, however, below those at which the destruction of the nuclear carbon structure becomes excessive. For instance, the present process is particularly applicable to the production of 3,5-dimethyl aniline by subjecting isophorone or its homologues, together with substantial amounts of ammonia, to the action of activated alumina which may or may not be impregnated with or contain substantial but lesser amounts of a metal or metal compound having catalytic dehydrogenating activity, as will be described hereinbelow. This reaction is preferably effected in the vapor phase and at elevated temperatures. Also, in order to increase the yield of the desired xylidine, while at the same time decreasing the conversion of the isophorone to the phenols, it is preferred to effect the reaction at superatmospheric pressures such as those in the neighborhood of about 20 atmospheres. The use of these superatmospheric pressures is also beneficial in that it increases the yield of nitrogen-containing heterocyclic compounds such as the aforementioned alkylated pyridines of the type of collidines.

The invention may therefore be generally stated to comprise the controlled catalytic treatment of non-aromatic cyclic ketonic compounds to produce aromatic amino compounds and/or aromatic hydroxy compounds containing the same number of nuclear carbon atoms, as well as to produce heterocyclic compounds containing a nitrogen atom in the ring, said process being effected by subjecting the above-mentioned and hereinbelow more fully described ketonic compounds, together with ammonia or a primary or secondary amine, in the vapor phase and at elevated temperatures, to the action of a catalyst having catalytic dehydrogenating activity, and particularly to the action of an activated alumina which may or may not contain, or the surface of which may or may not have incorporated therein, a metal or a metal compound having catalytic dehydrogenating activity.

The process of the present invention is applicable to the catalytic treatment of the whole class of non-aromatic cyclic ketonic compounds. The desired aromatic and heterocyclic compounds are, however, more readily obtained when the process is applied to the treatment of ketonic compounds in which the non-aromatic nucleus is mononuclear and preferably already contains at least one double bond. The process is also applicable to the catalytic conversion of the above-outlined class of cyclic compounds which contain a hydrogen atom directly attached to a saturated carbon atom which is adjacent to the carbonyl group, particularly when the nucleus also contains a quaternary carbon atom. A particularly suitable group comprises ketonic compounds containing a single non-aromatic monocyclic nucleus of six carbon atoms, said nucleus having three alkyl groups attached to the 3,5,5 positions respectively and having a hydrogen atom attached to a satuated carbon atom which is adjacent to the carbonylic group. The following are illustrative examples of some of the non-aromatic cyclic ketonic compounds which may be catalytically treated in accordance with the process of the present invention to produce the above-mentioned and similar aryl amines, hydroxylated aromatic compounds and heterocyclic compounds containing a nuclear nitrogen atom: isophorone, homo-isophorone, hydroxy isophorone, pulegone, isopulegone, carbenone, carvone, gamma dicarvelone, menthone, alpha gamma -bis (2-oxo-4-methylcyclohexyl) propane, 2,7-diketo-1,2,3,4,5, 6,7,8-octohydronaphthalene, alpha keto tetrahydronaphthalene, Buchu camphor and diosphenols. The methyl groups in the various compounds falling in the above class, such as in isophorone, may be substituted by any alkyl radical such as ethyl, propyl, isopropyl, butyl, isobutyl, amyl, etc. Also, the nucleus may contain unsaturated side chains as in the case of carvone, as well as various other suitable substituents such as hydroxy radicals, hydrogen atoms, and the like. The present process is, however, particularly applicable to the catalytic treatment of isophorone and of its homologues, i. e. homo-isophorone, to produce high yields of xylidines, phenols and collidines.

It was pointed out above that the process of the present invention is effected by subjecting the above ketonic compounds to the action of ammonia or of primary or secondary amines. Therefore it may be stated that the process of the present invention is applicable to the interaction of the above ketonic compounds with a compound having the general structural formula

in which the R and R' may be either a hydrogen atom or an alkyl, aryl, aralkyl, or alicyclic radical. Nevertheless, the yield of the desirable products, and particularly of the aromatic amino compounds, depends at least in part on the specific compound of the above class which is reacted with the aforementioned ketonic compounds. For instance, it was found that, other conditions being equal, greater yields of xylidines are produced when isophorone is reacted with ammonia, and that the yield of the xylidines is lowered when a secondary amine is used as compared to the yield obtainable when the corresponding primary amine is employed as one of the reactants.

Any substance possessing high dehydrogenating and/or dehydrating activity may be used as the catalyst for the initiation and promotion of the reaction or reactions. It has been found, however, that Activated Aluminas, which may or may not have a dehydrogenating metal or metal compound incorporated in their surface, are particularly suitable catalysts for use in effecting the reactions in accordance with the process of the present invention. There is a wide variety of activated, i. e. adsorptive aluminas. Some of these may be prepared from natural bauxites, while others are produced synthetically. The aluminas which, upon heating, are converted into alpha alumina through gamma alumina, comprise or form the activated or adsorptive aluminas referred to hereinabove and in the appended claims. These aluminas include: alumina alpha trihydrate, alumina beta trihydrate, alumina trihydrate, alumina mono-hydrate, gamma alumina, gelatinous alumina hydroxide and bauxite. The physical, chemical and catalytic properties of the above and other adsorptive aluminas may vary within relatively wide limits depending on small variations in the processes and methods used in their preparation. A suitable type of adsorptive alumina may be prepared by dehydration of alumina trihydrate crystallized from alkali aluminate solutions. Of this type, a particularly suitable material is that prepared from massive alumina trihydrate as for example the material described and claimed in the U. S. Patents 1,868,869 and 2,015,593. The various properties also depend, at least in part, on the degree of dehydration to which the various hydrated aluminas of the above type are dehydrated, i. e. activated. For instance, activated aluminas which predominate in alumina alpha monohydrate and gamma alumina, and which are suitable as a catalyst to effect the desired conversion reactions, are produced when the hydrated aluminas, such as the aforementioned alumina alpha and beta trihydrates, are dehydrated to a water content of between about 7% and about 12%. An even more suitable catalyst, the use of which is at least preferred in some cases, is formed by a more vigorous dehydration, for example, to a water content of below about 6%, in which case the aluminas consist predominantly of gamma alumina. Certain selected bauxites, such as the activated bauxite sold under the trade-name "Porocel," have been found to be particularly suitable as the catalyst for the production of high yields of aromatic amino compounds, e. g. xylidines. This type of catalyst is preferably first treated, for instance, by known magnetic means to remove the portion containing the larger part of the iron-containing particles which are invariably present, and then carefully calcined to the desired state of hydration. This special activated bauxite generally has the following properties:

| | |
|---|---|
| Particle size | 8–14 mesh |
| Bulk density | About 0.9 |
| Surface area | About 160 square meters per gram |
| $Al_2O_3$ | About 70% |
| $H_2O$ | About 8.4% |
| $Na_2O$ | About 0.9% |
| $Fe_2O_3$ | About 8.6% |
| $SiO_2$ | About 8.7% |
| $TiO_2$ | About 3.4% |

As will be shown hereinbelow, the use of this activated bauxite as the catalyst for the catalytic treatment of the specified ketonic compounds, such as isophorone, with ammonia results in high yields of the aromatic amino compounds, such as the xylidines, while at the same time apparently inhibiting or decreasing the formation of the corresponding aromatic hydroxy compounds, e. g. xylenols.

Another group of dehydrogenating catalysts which may be used for the catalytic treatment of the specified ketonic compounds comprises the known metals and metal compounds possessing relatively high dehydrogenating activities or properties. The following are examples of metals suitable for the catalytic conversion in accordance with the process of the invention: chromium, nickel, iron, cobalt, manganese, vanadium, titanium, scandium, copper, zinc, zirconium molybdenum, rubidium, platinum, rhodium, silver, cadmium, the rare earths, tantalum, osmium, iridium, gold, palladium and uranium. These metals may be employed individually or in the form of mixtures or alloys thereof, such alloys or mixtures comprising, for example, silver and copper, chromium and copper, zinc and copper, nickel and aluminum, nickel and zinc, nickel and cobalt, etc.

Still another group comprises the oxides, halides, sulfides, selenides, tellurides, phosphates, manganates, molybdates, chromates, bichromates, etc., of the above class of metals. Of these, a preferred sub-group comprises the oxides of iron, cobalt and/or chromium. Another subgroup comprises the sulfides of the metals of the left-hand members of group VI, alone or in mixture with other metal sulfides, e. g. sulfides of nickel and tungsten.

Any one or a plurality of the above and similar metal or metal compound catalysts possessing dehydrogenating activity may be used alone, in admixture with another of said metals or metal compounds, or as a deposit on the surface of a carrier, such as pumice, clay, diatomaceous earth, kieselguhr, and the like, or they may be mixed with, deposited or incorporated into the surface of substances such as the above-outlined adsorptive aluminas. In the latter case, the catalyst will essentially comprise an activated alumina and a substantial but lesser amount of a metal or metal compound possessing catalytic dehydrogenating activity. These compound catalysts may be prepared in a variety of suitable manners, a convenient method comprising the impregnation of activated alumina with a solution, preferably an aqueous solution, of a metal which it is desired to combine with the adsorptive alumina, and then drying at the desired temperature. Other convenient procedures are those disclosed in the U. S. Patent 2,184,235. In any case, anyone skilled in the art may readily prepare a catalyst of any desired initial or final composition. These catalysts, whether they be the activated bauxite, preferred for the production of xylidenes, and the like, the various mentioned adsorptive aluminas, the metals or metal compounds possessing high catalytic dehydrogenating activity, or physical mixtures or chemical combinations thereof, may be employed in any desirable or suitable form as for example in the form of pellets, granules or powders of any desired size. This solid catalyst may be employed in the manner customary in catalytic processes of this general type, and may usually be packed, in the desired quantity or amount, into a suitable reaction tube or chamber which is of any appropriate size and of any suitable material. This catalytic material is generally maintained at the desired or optimum operating temperature as, for example, by suitable external heating means, while the ketonic material and the ammonia (or the amine) are conveyed, preferably in the vapor phase, through the reactor and in contact with the catalyst at a desirable or optimum rate or space velocity. The term "space velocity" as employed herein and in the appended claims, may be defined as the number of moles of the gaseous or vaporous starting ketonic material contacted with a liter of the catalyst per hour.

Although the volumetric ratio of the starting ketonic material to ammonia or the amine may vary within relatively wide limits, it may be stated that, in order to produce the desired aromatic amino compounds, it is desirable, if not necessary, to employ a molal excess of the ammonia or amine. In fact, as this will be shown in the examples, an increase in the mol ratio of, for example, ammonia to the ketonic compound correspondingly increases the yield of the desired aromatic amino compounds. Conversely, a decrease in this mol ratio will decrease the yield of the aromatic amino compounds, and will correspondingly increase the conversion of the starting non-aromatic cyclic ketonic to aromatic hydroxy compounds. In this connection it must be noted that in the catalytic treatment of isophorone and of its homologues with ammonia in accordance with the present process, the total conversion of the isophorone to desirable products is substantially unaffected, or at most affected only to a minor degree even by a relatively large change in the mol ratio of the ammonia-ketone mixture subjected to treatment. Generally speaking, it is preferred to employ mol ratios of between about 2:1 and about 10:1. However, greater or lesser ratios may be used. A decrease of the mol ratio below about 2:1 will usually result in a considerable lowering of the yield of the desired aromatic amino compounds. On the other hand, an excessive increase of said ratio, for example above about 20:1, is also undesirable since very high concentrations of the ammonia or amine will cause excessive dilution of the starting ketonic compound and thus decrease the output of the desired products. Such high concentrations should therefore be avoided for economic reasons.

When effecting the catalytic conversions according to the present invention in a continuous or intermittent manner, it is possible to convey the alicyclic ketonic material through the catalyst-containing reaction zone at any desirable or optimum space velocity. The optimum space velocities to be used will depend on a number of variables, such as the character of catalyst employed, degree of its activity, the specific non-aromatic cyclic ketonic compound or compounds treated, the temperature and pressure employed, the degree of per pass conversion desired, and the character of the reaction product or products desired. In general, and particularly when it is desired to produce aromatic amino and/or aromatic hydroxy compounds, the space velocity, temperature and pressure may be controlled or regulated for the specific substance treated and/or catalyst employed so as to obtain practical conversions at a practical rate while substantially avoiding or at least greatly inhibiting various undesirable side reactions such as the decomposition or rupture of the nuclear carbon structure.

It is thus seen that the space velocities for the ketonic starting material may be varied within relatively wide limits. However, in the case of isophorone and of its homologues, and particularly when the reaction is to be effected within the preferred temperature range, the preferred space velocity is within the approximate range of about 5 to 30, satisfactory yields having been obtained with space velocities of between about 5 and 20. However, higher or lower space velocities may also be used and may even be preferred in some cases.

The preferred temperature range for effecting the catalytic conversion is between about 400° C. and about 650° C., optimum yields of the desired xylidine having been obtained when isophorone was treated at temperatures of between about 400° C. and about 550° C. Obviously, higher and lower temperatures may also be used. Generally speaking, at the lower temperatures the catalytic effect of the catalyst decreases to such a degree that uneconomically low space velocities may be required to obtain the desired degree of conversion. Very high temperatures are also to be avoided because of excessive decomposition of the nuclear carbon structure of the starting ketonic material. Generally, in such cases the undesirable decomposition to carbon and/or low boiling carbon-containing substances may be inhibited by employing relatively high space velocities and/or various inert diluents.

Although the reaction may be effected at atmospheric pressures, higher and lower pressures may also be used. In fact the specific pressure employed has a marked influence on the character of the reaction products formed. For instance, as will be seen from the examples presented hereinbelow, an increase in the operating pressure, other conditions being equal, favors the formation of heterocyclic nitrogen-containing compounds, e. g. collidines, at the expense of the aromatic amino compounds, such as the xylidines, which are produced when the catalytic treatment of the alicyclic ketonic compounds is effected at lower pressures, e. g. atmospheric pressure.

The process may be effected in a batch, intermittent or continuous manner. Since the reaction is generally effected in the vapor phase, and since it is at least preferred to maintain the ketonic compounds at the reaction temperature for a predetermined limited period of time, it is usually desirable to carry out the process in a continuous manner. In such a case, the starting ketonic material may be vaporized in a separate chamber or the front section of the reaction chamber, and then, after being mixed with ammonia or the amine, passed through the reaction zone at the optimum temperature and the desired space velocity. In the alternative, the liquid ketonic material may be vaporized in the reaction chamber proper, the ammonia or the amine being introduced therewith or divided into several portions and introduced at different points along the length of the reaction zone. The reaction temperature in the reaction zone may also be equalized by using inert or relatively inert diluents, which are preferably gaseous or vaporous at the reaction temperatures employed. The use of these diluents also promotes a more uniform reaction rate, restricts the amount of undesirable by-products, and even may increase the catalyst life. Hydrogen, nitrogen, steam and even certain hydrocarbons are examples of such diluents which may be used individually or in combination with each other or with other diluents and in amounts adapted to the particular feed material, temperature, pressure and specific catalyst used.

The following examples serve to illustrate the process of the present invention and the advantages and benefits derived therefrom. It is to be understood however, that there is no intention of being limited by any specific details of operation, such as temperature, pressure, mol ratio of isophorone to ammonia, or the specific starting materials, since the invention is co-extensive in scope with the appended claims.

Example I

This run was conducted in a vertically disposed electrically heated tubular seamless iron vessel, approximately the central two-thirds of which were filled with the activated bauxite sold under the trade-name of Porocel. The interior of this reaction vessel was maintained at a temperature of about 500° C. A vaporous mixture of ammonia and isophorone used in a mol ratio of about 10:1 was conveyed through the catalyst bed at substantially atmospheric pressure and at a rate of 10 mols of isophorone per liter of catalyst per hour, i. e. at an isophorone space velocity of 10. An analysis of the reaction products showed that about 92% by weight of the isophorone reacted. The yield of aromatic amines was equal to approximately 60%, while the yield of aromatic hydroxy compounds was equal to about 7%. Approximately 95% of the aromatic amines thus formed consisted of 3,5-dimethyl aniline.

Example II

This run was conducted in the same apparatus as that employed in the previous example. Also, the reaction temperature, pressure, space velocity and the ammonia-isophorone mol ratio were the same as those employed in the run described in Example I. In this case, however, the catalyst consisted of an Activated Alumina predominating in alumina alpha monohydrate and gamma alumina. An analysis of the reaction products showed that the total conversion of the isophorone was equal to about 92% by weight. The yield of aromatic amines, however, was 43%, while that of the aromatic hydroxy compounds was equal to about 17%. As in the previous run, 3,5-dimethyl aniline constituted about 95% of the produced aromatic amines.

A comparison of the results obtained in both runs shows that there was substantially no difference in the total conversion of isophorone; nevertheless the use of activated bauxite increased the conversion to xylidine while at the same time, in effect, inhibiting the production of aromatic phenols such as xylenol.

Example III

The apparatus was the same as that employed in the previous runs. However, in this case it contained a catalyst essentially consisting of ferric oxide incorporated in the surface of Activated Alumina. The reaction tube temperature was maintained at between about 500° C. and 520° C. Ammonia and isophorone in a mol ratio of 4:1 were conveyed through the catalyst bed at substantially atmospheric pressure and at a rate of about 10 mols of isophorone per liter of catalyst per hour. An analysis of the reaction product indicated that only about 53% by weight of the isophorone reacted, the conversion to aromatic amines being equal to 18% while the conversion to aromatic hydroxy compounds was equal to about 17%. The yield of the aromatic amines was equal to about 34%, about 95% of which consisted of 3,5-dimethyl aniline.

Example IV

A series of 3 runs was made to determine the effect of the ammonia-isophorone mol ratio in the feed on the yield of xylidine (3,5-dimethyl aniline) as well as on the yield of aromatic hydroxy compounds. In each case the above-mentioned reaction vessel contained a catalyst essentially comprising gamma alumina. The reaction temperature was maintained at about 500° C. and the ammonia-isophorone mixture was conveyed through the reactor and in contact with the catalyst at substantially atmospheric pressure and at a rate of about 10 mols of isophorone per liter of catalyst per hour. The conversion and yields of the various products are presented in the following table together with the ammonia-isophorone mol ratios employed in each case.

|  | Run A | Run B | Run C |
| --- | --- | --- | --- |
| Ammonia-isophorone mol ratio | 2:1 | 6:1 | 10:1 |
| Total isophorone conversion____per cent__ | 80 | 82 | 83 |
| Yield of aromatic amines_____do____ | 35 | 44 | 45 |
| Yield of aromatic hydroxy compounds per cent__ | 45 | 35 | 31 |

As in the previous runs, 3,5-dimethyl aniline consituted approximately 95% of the aromatic amino compounds produced. An analysis of the above data shows that an increase in the ammonia-isophorone mol ratio has substantially no effect on the total conversion of isophorone but increases materially the yield of the aromatic amino compounds (xylidines) while at the same time decreasing the yield of the aromatic hydroxy compounds (xylenols).

Example V

The catalyst employed in this run comprised an Activated Alumina predominating in alumina alpha monohydrate and gamma alumina. This catalyst was disposed in a reaction vessel maintained at a temperature of about 500° C. A vaporous mixture of ammonia and isophorone employed in a mol ratio of 9:1 was conveyed through said reactor at a pressure of about 300 pounds per sq. in. and at a rate of about 10 mols of isophorone per liter of catalyst per hour. The total conversion of isophorone was equal to about 91%, the conversion to aromatic amines being equal to 53% and that to aromatic hydroxy compounds 10%. The yield of aromatic amino compounds was 62%. Of these, about 76.5% consisted of 3,5-dimethyl aniline, while the rest consisted of symmetrical collidine.

Example VI

This run was conducted in the same apparatus as that employed in the previous example. The catalyst in this case consisted of activated bauxite. A vaporous mixture of ammonia and isophorone employed in a mol ratio of 6:1 was conveyed through the catalyst bed at a pressure of about 300 pounds per sq. in. and at a rate of about 6.8 mols of isophorone per liter of catalyst per hour. The reaction temperature was maintained at about 500° C. An analysis of the reaction products showed that the total conversion of isophorone was equal to about 90% by weight, the conversion to aromatic amino compounds being equal to 56% and that to aromatic hydroxy compounds about 1% by weight. The yield of aromatic amino compounds was equal to 62%. Approximately 72% of the aromatic amino compounds consisted of 3,5-dimethyl aniline, the remainder comprising symmetrical collidine.

A comparison of the runs described in Examples V and VI with the runs described in Examples I and II clearly shows the beneficial results obtained by using elevated pressures. Also, it is seen that the use of pressures increases the yield of collidine at the expense of the formation of xylidines. Furthermore, a comparison of the results shows that activated bauxite is an excellent catalyst and that when the reaction or conversion is effected at elevated pressures and with the use of this catalyst, one obtains high yields of xylidines and collidines with substantially no formation of aromatic hydroxy compounds of the type of xylenols.

The aromatic amino compounds such as xylidine may be readily separated from the reaction products in any suitable manner. In the examples described hereinabove the xylidine was extracted with dilute sulfuric acid, the acid solution being then separated and neutralized to release the xylidine as a separate liquid phase, which was removed by decanting. Suitable alternative recovery methods include the condensation and fractionation of reaction products or an immediate concurrent quenching of the reaction products, which may be accomplished by conducting the reaction products through a plurality of tubes of a small bore together with an acidic solution such as a dilute sulfuric acid solution. The acid solution thus formed contains the xylidines, which may then be recovered as aforesaid. The normally gaseous materials obtained as by-products, e. g. hydrogen and methane, may be released to the atmosphere or conducted to a gas holder or other suitable container for further use. In order to effect high conversions and yields of the desired products, the unconverted alicyclic ketonic substances may be rapidly conveyed or recycled through the reaction zone.

The catalysts employed for the catalytic conversions in accordance with the process of the present invention are relatively stable under the conditions of their practical use and may therefore be continuously employed under relatively long periods without any substantial decrease in their activity. However, with time, they will gradually lose activity, this loss in the absence of any specific poisons being primarily due to deposition of carbon on the catalyst surfaces. It has been found that the original activity of such catalysts may be restored substantially completely by oxidizing the deposited carbon and thereby effecting its removal. It has also been found that this oxidation, which is preferably effected at temperatures which are not materially in excess of about 700° C., may be carried out without removing the spent catalyst from the reaction tube or chamber. This oxidation may be realized by using oxygen, air or a mixture of air and an inert carrier such as nitrogen, and by conveying this substance at a suitable temperature and at an optimum space velocity through the catalyst to be regenerated. The time of treatment necessary to restore the catalyst activity will depend upon various factors, such as the conditions of the reactivation treatment, etc.

We claim as our invention:
1. A process for the production of 3,5-dimethyl aniline and symmetrical collidine from isophorone, which comprises mixing isophorone vapors with ammonia in a mol ratio of about ten mols of ammonia per mol of isophorone, conveying said vaporous mixture, at an elevated pressure of about 300 pounds per square inch, over a solid catalyst essentially comprising an activated bauxite, maintaining the reaction temperature at about 500° C., and recovering 3,5-dimethyl aniline and symmetrical collidine from the reaction products thus formed.

2. A process for the production of 3,5-dimethyl aniline from isophorone which comprises mixing isophorone vapors with ammonia in a mol ratio of about 10 mols of ammonia per mol of isophorone, contacting said vaporous mixture with a solid catalyst essentially comprising an activated bauxite, maintaining the reactants at substantially atmospheric pressure and at a temperature of about 500° C., and recovering 3,5-dimethyl aniline from the reaction products thus formed.

3. A process for the production of 3,5-dimethyl aniline and of symmetrical collidine which comprises maintaining a solid catalyst essentially comprising an activated alumina predominating in alumina alpha monohydrate and gamma alumina at a temperature of between about 400° C. and about 650° C. forming a vaporous mixture containing between about 2 and 20 mols of ammonia per mol of isophorone, contacting said vaporous mixture with the catalyst at an elevated pressure and for a period of time sufficient to effect the reaction, and separating the dimethyl aniline and the collidine from the reaction products.

4. A process for the production of 3,5-dimethyl aniline and of symmetrical collidine, which comprises maintaining a solid catalyst essentially comprising an Activated Alumina at a temperature of between about 400° C. and about 650° C., forming a vaporous mixture containing ammonia and isophorone in a mol ratio of between about 2 and about 20 mols of ammonia per mol of the isophorone, contacting said vaporous mixture with the catalyst, and recovering the dimethyl aniline and the collidine from the reaction products.

5. A process for the production of amino aromatics which comprises contacting a vaporous mixture comprising a molal excess of ammonia and a compound selected from the group consisting of isophorone, homo-isophorone and homologues thereof, with a solid catalyst predominating in Activated Alumina, maintaining the catalyst at a temperature of between about 400° C. and about 650° C., and recovering the 3,5-dimethyl aniline from the reaction products.

6. The process according to claim 5 wherein the ammonia-isophorone mol ratio is between about 2:1 and about 20:1.

7. A process for the production of aromatic amines and alkylated pyridines from a substituted cyclohexenone having three alkyl groups attached to the 3,5,5 positions of the cyclohexenone nucleus, respectively, and having a hydrogen atom attached to a saturated carbon atom which is adjacent to the carbonylic group, which comprises mixing said ketonic compound with a molal excess of ammonia, subjecting the vapors of said mixture to the action of a dehydrogenating catalyst containing adsorptive alumina at a temperature of between about 400° C. and about 650° C. and recovering the aromatic amines and the alkylated pyridines from the reaction products thus formed.

8. The process according to claim 7, wherein the reaction is effected at a superatmospheric pressure.

9. A process for the production of aromatic amines and of six-membered heterocyclic compounds containing a single nitrogen atom in the nucleus from a ketonic compound containing an aliphatic carbocyclic nucleus of 6 carbon atoms, said nucleus containing at least one unsaturated linkage and a carbon atom directly linked to a ketonic oxygen atom, which comprises mixing said ketonic compound with a molal excess of amonia, subjecting the vapors of said mixture to the action of a dehydrogenating catalyst containing adsorptive alumina at a temperature of between about 400° C. and about 650° C., and separating the aromatic amines and the heterocyclic compounds from the reaction products.

10. In a process for the production of aromatic amines from a ketonic compound containing an aliphatic carbocyclic nucleus of 6 carbon atoms, said nucleus containing at least one unsaturated linkage and a carbon atom directly linked to a ketonic oxygen atom, the steps of mixing the vapors of said ketonic compound with a molal excess of ammonia, and subjecting said vaporous mixture, at an elevated temperature which is below that at which substantial degradation of the nuclear carbon structure of the ketonic compound occurs, to the action of a catalyst possessing high dehydrogenating activity.

11. In a process for the production of valuable reaction products, the steps of forming a vaporous mixture comprising a ketonic compound containing an aliphatic monocyclic nucleus of at least six carbon atoms wherein a nuclear carbon atom is directly linked to a ketonic oxygen atom, and a molal excess of ammonia, and subjecting said vaporous mixture to the action of a dehydrogenating catalyst at an elevated temperature below that at which excessive nuclear degradation of the ketonic compound occurs.

12. In a process for the production of valuable reaction products, the step of subjecting a mixture of a ketonic compound containing at least one aliphatic monocyclic nucleus of at least six carbon atoms and a ketonic oxygen atom directly linked to a nuclear carbon atom and a molal excess of ammonia to the action of a dehydrogenating catalyst at an elevated temperature below that at which excessive nuclear degradation of the ketonic compound occurs.

13. A process for the production of amino aromatics which comprises contacting a vaporous mixture comprising a molal excess of ammonia and a compound selected from the group consisting of isophorone, homo-isophorone and homologues thereof, with a solid catalyst predominating in Activated Alumina, maintaining the catalyst at a temperature of between about 400° C. and about 650° C., and recovering amino aromatics from the reaction products.

14. A process for the production of amino aromatics which comprises contacting a vaporous mixture comprising a molal excess of ammonia and a compound selected from the group consisting of isophorone, homo-isophorone and homologues thereof, with a dehydrogenation catalyst, maintaining the catalyst at a temperature of between about 400° C. and about 650° C., and recovering amino aromatics from the reaction products.

15. In a process of producing aromatic amino compounds, the step of subjecting a vaporous mixture comprising a molal excess of ammonia and a compound selected from the group consisting of isophorone, homo-isophorone and homologues thereof, with a dehydrogenation catalyst at an elevated temperature below that at which excessive nuclear degradation of the organic compound treated occurs.

16. A process for the production of amino compounds which comprises contacting a vaporous mixture comprising a compound selected from the group consisting of isophorone, homo-isophorone and homologues thereof, and a molal excess of ammonia, with a solid catalyst predominating in Activated Alumina, maintaining said catalyst at a temperature of between about 400° C. and about 650° C., and recovering amino aromatics from the reaction products.

SEAVER A. BALLARD.
DE LOSS E. WINKLER.